United States Patent [19]

Kapela et al.

[11] Patent Number: 4,816,013
[45] Date of Patent: Mar. 28, 1989

[54] BICYCLE FREE-WHEEL RING, METHOD OF FIXING SPROCKETS TO SUCH A RING AND FREE WHEEL THUS OBTAINED

[75] Inventors: Didier Kapela, St-Valery-sur-Somme; Michel Marnat, Dargnies, both of France

[73] Assignee: Etablissements Maurice Maillard, Icheville, France

[21] Appl. No.: 81,510

[22] Filed: Aug. 5, 1987

[30] Foreign Application Priority Data

Aug. 5, 1986 [FR] France ................................ 86 11323

[51] Int. Cl.[4] .............................................. F16H 55/12
[52] U.S. Cl. .................................................. 474/160
[58] Field of Search ................. 474/160, 158, 152, 78; 192/6 A; 29/159 R, 159 A

[56] References Cited

U.S. PATENT DOCUMENTS 3,942,615 3/1976 Craig ................................. 474/160 X

FOREIGN PATENT DOCUMENTS 234914 2/1945 Switzerland ........................ 474/160
647876 4/1951 United Kingdom .
938599 10/1963 United Kingdom .

*Primary Examiner*—Thuy M. Bui
*Attorney, Agent, or Firm*—Sughrue, Mion, Zinn, Macpeak, and Seas

[57] ABSTRACT

Bicycle free-wheel ring (1) possessing an inner surface equipped with a ball race for a row of balls in the vicinity of each of its ends and with splines (9) in the form of ratchets in an approximately central zone, and an outer surface (11) intended to receive at least two sprockets. This outer surface is of circular section and possesses at least one smooth sprocket-reception zone. The sprockets (12) have a bore corresponding to the smooth zone of the outer surface of the ring, to which they are fixed by welding, soldering, bonding or expansion.

9 Claims, 2 Drawing Sheets

BICYCLE FREE-WHEEL RING, METHOD OF FIXING SPROCKETS TO SUCH A RING AND FREE WHEEL THUS OBTAINED

FIELD OF THE INVENTION

The present invention relates to a multi-speed bicycle free wheel, that is one possessing two or more sets of teeth.

BACKGROUND OF THE INVENTION

Such free wheels are known which possess:

An outer ring which may or may not possess an integrally produced chain toothing on its periphery. In its inner part the ring bears splines in the form of ratchets, and in its end parts two ball races for rows of balls. Toothed sprockets are fixed to its outer surface, their number varying in accordance with the number of speeds required. These sprockets are fixed to the ring by threading, keying or a combination of these two methods. In the case where the sprockets are flat and keyed to the ring, their correct mutual spacing is maintained by spacers. Rings are also known on which the sprockets are fixed in rotation and are kept properly spaced by spacers. Their immobilization in the axial direction is ensured by an auxiliary piece fixed to the ring by threading, crimping or hooping.

A star-wheel which is threaded internally in order to be able to be fixed on the hub of the bicycle wheel. A star-wheel of this type carries, in cavities made in its outer part, clicks and springs which interact with the ratchets of the ring, thus ensuring the operation of the free wheel. It also possesses a ball race for a row of balls.

A flange of lid screwed onto the star-wheel and possessing a ball race for a row of balls.

Two rows of balls which, during operation as a free wheel, permit the ring to revolve freely about the assembly formed by the star-wheel and the flange.

Such free wheels possess the disadvantage of requiring the production, on the outer part of the wheel, of keying grooves and/or of thread, and, on the central part of the sprockets, of keying notches or of thread. Moreover, when the sprockets are assembled on the ring, it is necessary to align opposite one another the keying members of the complementary pieces to be assembled.

The object of the present invention is to remedy these disadvantages and to make superfluous the presence of spacers or of an auxiliary immobilization piece.

SUMMARY OF THE INVENTION

The invention thus relates to a method of fixing sprockets to a bicycle free-wheel ring possessing an inner surface provided with a ball race for a row of balls in the vicinity of each of its ends, and splines in the form of ratchets in an approximately central zone, and an outer surface intended to receive at least two sprockets, the said outer surface being of circular section and possessing at least one smooth sprocket reception zone, characterized in that the method consists of making in each sprocket a smooth central bore to interact with the said outer surface of the ring and fixing these sprockets to the outer surface by welding, soldering, bonding or expansion.

According to another feature, this outer surface possesses two cylindrical parts of different diameters, intended to receive sprocket groups possessing bores of corresponding diameters.

BRIEF DESCRIPTION OF THE DRAWINGS

The invention will be better understood from reading the description which follows, and which is given with reference to the attached drawings, provided solely by way of example, in which.

DESCRIPTION OF THE PREFERRED EMBODIMENTS OF THE INVENTION

Figure 1:
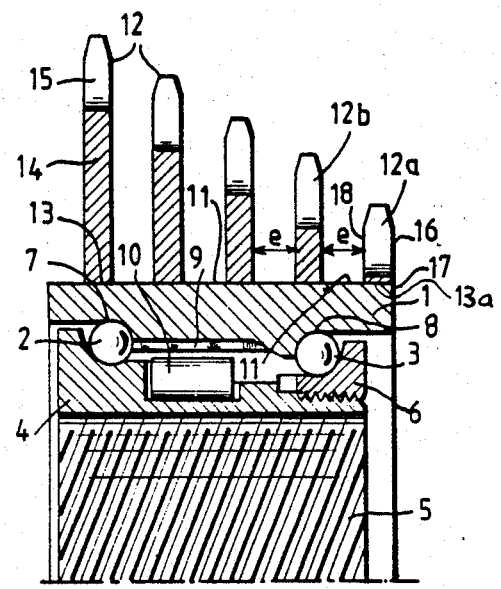
FIG. 1 is a half-view in axial section of a free wheel possessing a ring according to the invention.

In FIG. 1, the reference numeral 1 represents a bicycle free-wheel ring in which a star-wheel 4 provided with an internal thread 5 and a flange 6 are mounted to rotate by means of two rows of balls 2, 3.

The inner surface of the ring 1 possesses at its ends two ball races 7, 8, respectively interacting with the rows of balls 2, 3, and in its central part ratchets 9 provided to interact with spring clicks 10 which are known per se and are retained in respective settings provided on the outer surface of the star-wheel 4. A plurality of toothed sprockets 12, of staggered diameter, are fixed to the outer surface 11 of the ring 1, their number being a function of the number of speeds required. The outer surface 11 is of circular section and smooth, in other words it possesses no recesses or roughnesses, and in particular possesses neither keying grooves nor a thread.

The toothed sprockets 12 are each in the form of a flat disc having a central bore 13 which is likewise smooth, without keying grooves or thread, then, extending radially, a continuous part 14 and finally teeth 15, regularly spaced over the periphery of the continuous part 14.

In order to fix the sprockets 12 to the ring 1, a ring is used whose length is selected as a function of the number of sprockets to be fixed. The smaller sprocket 12a to be fixed is positioned in a manner such that its outer face 16 is in the same plane as the end face 17 of the ring, perpendicular to the axis of the free wheel, and that its bore 13a is almost in contact with the outer surface 11 of the ring. The said sprocket 12a is fixed to the ring 1 by welding, soldering, bonding or expansion.

Wedges or gauges are positioned on the inner face 18 of the sprocket 12a, and one of the faces of the subsequent sprocket 12b is brought in contact with these wedges or gauges, in a manner such that the spacing e between the fixed sprocket and the sprocket to be fixed is maintained, and that the sprocket 12b to be fixed is parallel to the sprocket 12a already fixed. The sprocket 12b is then fixed by welding, soldering, bonding or expansion to the outer surface 11 of the ring. After this fixing operation, all that is required is to remove the wedges or gauges and begin the operation again in order to fix the sprocket 12c in a position parallel to the previously fixed sprockets 12a, 12b, its spacing from the adjacent sprocket 12b having the same value e as the spacing between the sprockets 12a, 12b already fixed.

This operation will be repeated until all the sprockets required to obtain the desired number of speeds have been fixed.

Figure 2:
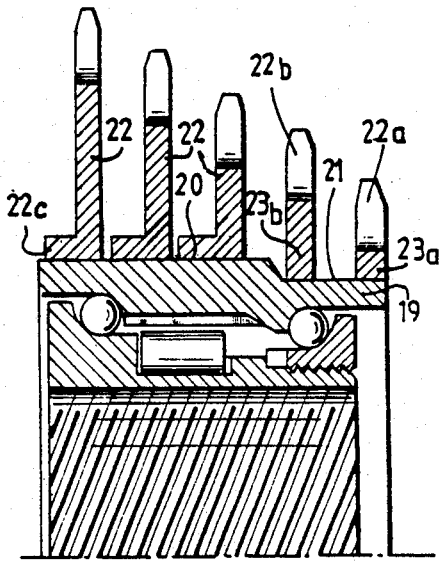
FIG. 2 is a view similar to FIG. 1 of a free wheel provided with a ring according to another embodiment of the invention.
Figure 3:
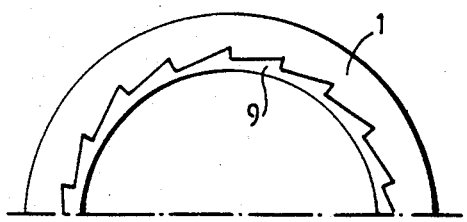
FIG. 3 is an end half-view on a smaller scale of the ring according to FIG. 1, without the sprockets.

In another form of embodiment shown in FIG. 2, the free-wheel ring 19 possesses on its outer surface a first cylindrical part 20 and a second cylindrical part 21 of lesser diameter. This second cylindrical part receives the two smaller sprockets 22a, 22b. By comparison with the arrangement described with reference to FIG. 1, an arrangement of this type makes it possible to have a more substantial continuous part 23a, 23b of the smaller sprockets in a manner such as to increase the strength of these sprockets. The fixing of the sprockets to this ring is carried out in the same manner as in the form of embodiment previously described.

It will, however, be noted that in this form of embodiment the sprockets 22 mounted on the cylindrical part 20 of larger diameter each consist of a disc provided with a central pressed skirt 22c, the length of the skirt 22c being such that when the said sprockets are arranged on the ring 19 an axial play remains between the end of the skirt of one sprocket and the adjacent sprocket, in a manner such that the sprockets 22 are in contact with the ring only. The presence of the skirts 22c makes it possible to increase the length of the bores of the sprockets and, hence, their contact surface with the surface of the free-wheel ring.

Figures 4, 5:
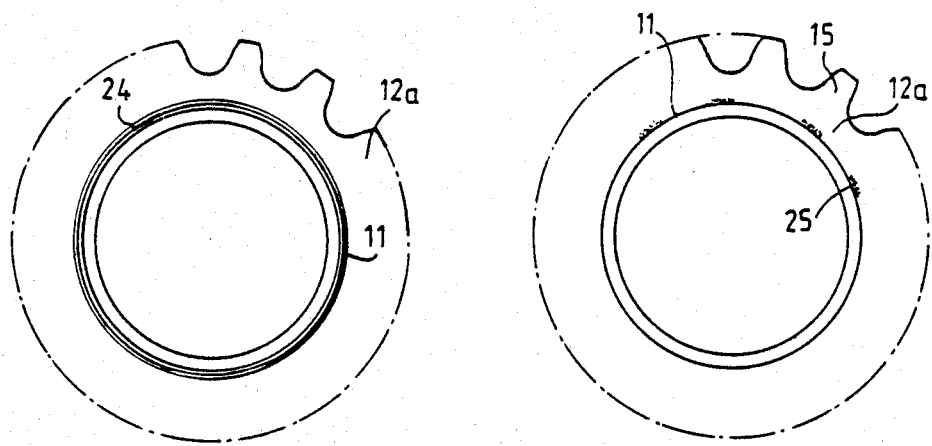
FIGS. 4 and 5 are diagrammatic views of methods of fixing the sprockets to the ring according to FIG. 1.

According to a first fixing method shown in FIG. 4, each of the sprockets such as the sprocket 12a is fixed to the outer surface 11 of the ring by weld seams 24 extending over 360°.

According to second fixing method shown in FIG. 5, the sprocket 12a is fixed to the outer surface of the ring by welding zones 25 covering a plurality of sectors regularly spaced over the periphery of the ring and together totalling less than 360°.

By virtue of the two forms of embodiment of the invention, the keying grooves, or the threads, have been eliminated. Similarly, these embodiments make it possible to eliminate keying notches or threads on the surface of the bores of the sprockets and do not require the use of spacers, which considerably redue the cost price of manufacturing the ring and the sprockets.

What is claimed is :

1. Method of fixing sprockets to a bicycle free-wheel ring possessing an inner surface provided with a ball race for a row of balls in the vicinity of each of its ends, and splines in the form of ratchets in an approximately central zone, and an outer surface intended to receive at least two sprockets, the said outer surface being of circular section and possessing at least one smooth sprocket reception zone, wherein in that the method comprises the steps of making in each sprocket a smooth central bore to interact with the said outer surface of the ring and fixing these sprockets to the outer surface by welding, soldering, bonding or expansion.

2. Method according to claim 1, further comprising that it consists of producing at least some of the said sprockets with respective central skirts and arranging the said sprockets on the free-wheel ring in a manner sprocket and the adjacent sprocket.

3. Method according to either of claims 1 and 2, characterized in that the said welding, soldering, bonding or expansion operations are carried out over the entire periphery of the ring.

4. Method according to either of claims 1 and 2, characterized in that the said welding, soldering, bonding or expansion operations are carried out over a a plurality of sectors regularly distributed over the periphery of the ring and together totalling less than 360°.

5. Bicycle free-wheel ring provided with sprockets, wherein the outer surface of the ring possess two smooth cylindrical parts of different diameters intended to receive groups of sprockets possessing bores of corresponding diameters, each sprocket being only in contact with the outer surface of the corresponding cylindrical part of the ring.

6. Bicycle free-wheel ring according to claim 5, wherein the sprockets are fixed on the outer surface by welding.

7. Bicycle free-wheel ring according to claim 5, wherein the sprockets are fixed on the outer surface by soldering.

8. Bicycle free-wheel ring according to claim 5, wherein the sprockets are fixed on the outer surface by bonding.

9. Bicycle free-wheel ring according to claim 5, wherein the sprockets are fixed on the outer surface by expansion.

* * * * *